(12) United States Patent
Kiran et al.

(10) Patent No.: US 7,650,293 B2
(45) Date of Patent: Jan. 19, 2010

(54) SYSTEM AND METHOD FOR WORKFORCE REQUIREMENTS MANAGEMENT

(75) Inventors: Ali S. Kiran, San Diego, CA (US); Celal Kaplan, La Jolla, CA (US); Tekin Cetinkaya, Carlsbad, CA (US); Murat Bayiz, Los Angeles, CA (US); Jeffrey Cameron, San Diego, CA (US)

(73) Assignee: Verint Americas, Inc., Melville, NY (US)

(*) Notice: Subject to any disclaimer, the term of this patent is extended or adjusted under 35 U.S.C. 154(b) by 48 days.

(21) Appl. No.: 10/832,509

(22) Filed: Apr. 27, 2004

(65) Prior Publication Data
US 2005/0240465 A1    Oct. 27, 2005

(51) Int. Cl.
*G06F 17/60* (2006.01)
(52) U.S. Cl. ............................... 705/8; 705/9
(58) Field of Classification Search ................. None
See application file for complete search history.

(56) References Cited

U.S. PATENT DOCUMENTS

| | | | | |
|---|---|---|---|---|
| 5,325,292 | A | * | 6/1994 | Crockett .................... 705/9 |
| 5,911,134 | A | * | 6/1999 | Castonguay et al. ........... 705/9 |
| 6,320,956 | B1 | * | 11/2001 | Cherry .................. 379/265.02 |
| 6,587,831 | B1 | * | 7/2003 | O'Brien .................... 705/8 |

(Continued)

FOREIGN PATENT DOCUMENTS

WO    01/61594 A2    8/2001

WO    0161594    8/2001

OTHER PUBLICATIONS

Gans, Noah and Koole, Ger and Mandelbaum, Avishai. Telephone Call Centers: Tutorial, Review, and Research Prospects. Manufacturing & Service Operations Management 5:79-141, 2003, 84 pgs.*

(Continued)

*Primary Examiner*—Albert DeCady
*Assistant Examiner*—Dave Robertson

(57) ABSTRACT

The present invention provides a workforce requirements management system and method that determines future demand for service related transactions or activity and optimizes the planning of workforce to meet the future demand. Initially, the workforce requirements management system reviews historical data regarding transaction volume and service activity to determine the future demand for such transactions or service activities. The historical data may come from a conventional enterprise resource planning application and/or include demographic data and/or economic indicators. The workforce requirements management system can optimize a forecast by isolating certain variance factors and refining the forecast accordingly. A forecast can also be optimized by estimating transaction times and correlating variance factors with estimated transactions times. Additionally, the workforce requirements management system can optimize the forecast based on the queuing model employed for the particular service. Finally, the workforce requirements management system can create a long term resource plan that identifies the most efficient balance of full time equivalent and part time equivalent staffing levels to meet the long term forecast need at the desired service level at the lowest overall labor cost. Specific outputs generated by the workforce requirements management system include a transaction forecast, a resource forecast, a resource plan, and a resource schedule.

20 Claims, 9 Drawing Sheets

U.S. PATENT DOCUMENTS

| | | | | |
|---|---|---|---|---|
| 6,732,079 | B1* | 5/2004 | Kintner et al. | 705/8 |
| 6,970,829 | B1* | 11/2005 | Leamon | 705/9 |
| 6,985,872 | B2* | 1/2006 | Benbassat et al. | 705/8 |
| 7,103,562 | B2* | 9/2006 | Kosiba et al. | 705/10 |
| 7,222,082 | B1* | 5/2007 | Adhikari et al. | 705/8 |
| 2003/0055706 | A1* | 3/2003 | Statfeld | 705/9 |
| 2005/0049901 | A1* | 3/2005 | Diao et al. | 705/7 |

OTHER PUBLICATIONS

Antipov, A. and Meade, N. Forecasting call frequency at a financial services call centre, Journal of Operations Research, 2002, v53, p. 953-960.*

Andrews, B. H. and S. M. Cunningham. L. L. Bean Improves Call-Center Forecasting. Interfaces 25(6), Nov.-Dec. 1995, p. 1-3.*

Bianchi, L. and Jarrett, J.E and Hanumara, R.C. "Forecasting incoming calls to telemarketing centers" The Journal of Business Forecasting Methods & Systems, Summer 1993, p. 3-11.*

Klungle R., and J. Maluchnik. Call center forecasting at AAA Michigan. Journal of Business Forecasting 20 (4), 1998, pp. 8-13.*

G. Jongbloed and G.M. Koole. Managing uncertainty in call centers using Poisson mixtures. Applied Stochastic Models in Business and Industry, 2001.*

PCT International Search Report and Written Opinion, International Application No. PCT/US05/13760, mailed Apr. 22, 2005.

Bianchi, Lisa, et al., "Forecasting Incoming Calls to Telemarketing Centers", The Journal of Business Forecasting, Summer, 1993, pp. 3-11.

Antipov, A. et al., "Forecasting Call Frequency at a Financial Services Call Centre", Journal of the Operational Research Society, 2002, pp. 953-690, vol. 53, No. 9.

* cited by examiner

SYSTEM AND METHOD FOR WORKFORCE REQUIREMENTS MANAGEMENT

BACKGROUND

1. Field of the Invention

The present invention generally relates to the planning of workforce requirements and more particularly relates to a computer implemented system and method for determining future demand and the corresponding workforce requirements to meet that demand.

2. Related Art

Rapid developments in computer resources have provided businesses in the service industry with the potential to collect and maintain vast historical databases of transaction history. Conventional applications called Enterprise Resource Planning ("ERP") applications have been developed over the years to generate such data. Examples of such conventional ERP packages include SAP, Baan, PeopleSoft, and others. Accordingly, volumes of historical transaction data are available to those businesses in the service industry that have archived the data produced by various ERP applications. For example, transaction data related to orders, service requests, and other activities is potentially available. Therefore, what is needed is a system and method that can access historical transaction data to predict what actions a service industry business can take to address future transaction volumes.

SUMMARY

A computerized system and method to determine future demand for a service or future transaction volume is presented. The level of future demand or transaction volume is used to determine the corresponding workforce requirements needed to meet that future demand or transaction volume. Future activity levels and corresponding workforce requirement needs are provided that optimize the number of full time and part time equivalents in the scheduled workforce.

The system capitalizes on the existence of previously created data from conventional enterprise resource planning systems. The system may additionally use location dependent average activity times and external data from other systems related to transaction volume, demographic factors, and economic indicators. The system uses all of this data to produce a transaction volume forecast, a resource requirement forecast, a resource plan, and a resource schedule, which comprises a recommendation for the optimal workforce levels and mixes (part time, full time, etc.).

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Certain embodiments as disclosed herein provide for systems and methods to manage workforce requirements in a service industry organization. For example, one method as disclosed herein allows for historical data created by an enterprise resource planning ("ERP") application to be analyzed in order to forecast transaction volume or service activity levels for a particular location. Certain demographic factors and economic indicators may also be employed to improve the accuracy of the forecast. Additionally, transaction times and service activity times can be measured for the location in order to determine the full time equivalent ("FTE") requirements at a granular level (e.g., half hourly FTE requirements). The FTE requirements can then be optimized with part time equivalent ("PTE") resources to identify the workforce (both FTE and PTE) requirements for the location and create a future workforce plan for the location.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
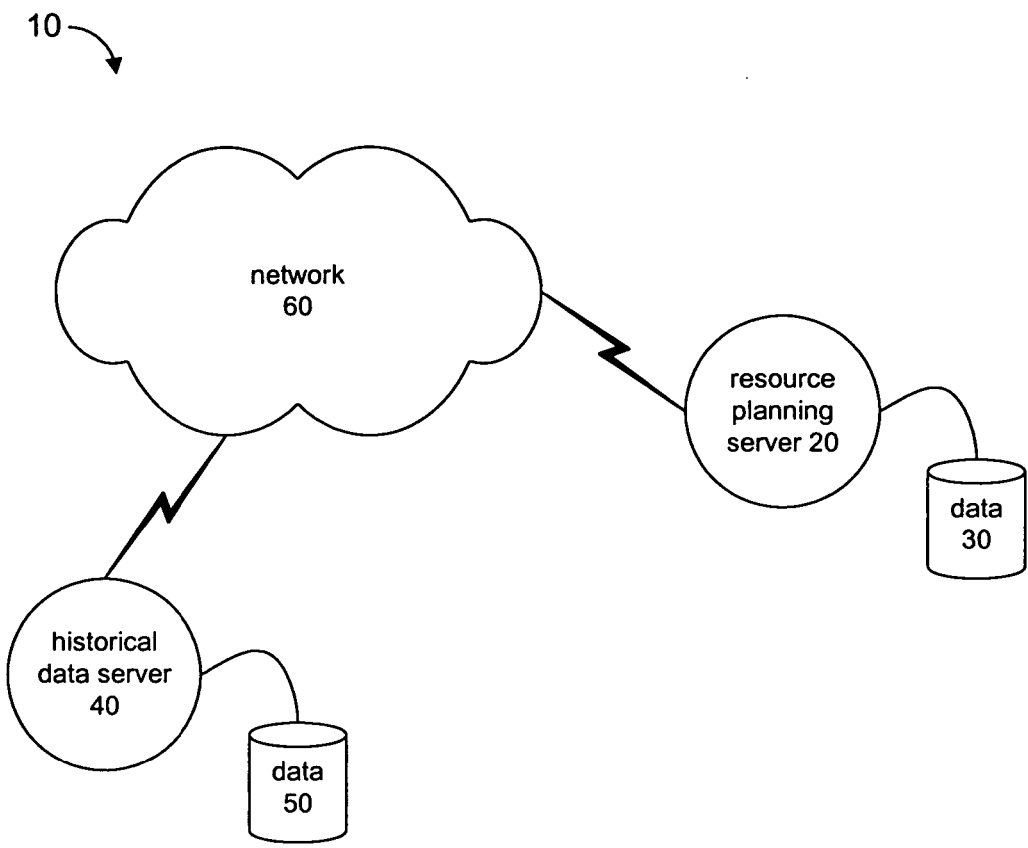
FIG. 1 is a block diagram illustrating an example system for workforce requirements management according to an embodiment of the present invention.

FIG. 1 is a block diagram illustrating an example system 10 for workforce requirements management according to an embodiment of the present invention. In the illustrated embodiment, the system 10 comprises a resource planning server 20 configured with a data storage area 30. The server 20 is communicatively coupled with a historical data server 40 over a network 60. The server 40 is also configured with a data storage area 50.

In one embodiment, the resource planning server 20 can be a stand-alone computer server, as will be understood by those having skill in the art. Preferably, the server 20 is connected to a network 60 so that is has access to remote data storage areas such as database 50. Data storage area 30 can be implemented as a conventional database with a database management system ("DBMS") that controls access to the data stored therein. Alternatively, the data storage area 30 can be a conventional file system or other implementation of a solution for the canonical storage of data.

Historical data server 40 may be implemented as a separate server computer or may be integrated on the computer as the resource planning server 20. Similarly, data storage area 50 may be the same physical device (or logical device with distributed physical devices) as data storage area 30. Alternatively, data storage area 30 may be a discrete physical device. In one embodiment, data storage area 50 comprises historical data from an ERP server that can be accessed and analyzed by the resource planning server 20.

The network 60 may be any type of network topology and employ one or more network communication protocols, as will be understood by one having skill in the art. The function of the network 60 is to provide connectivity and facility communication between the resource planning server 20 and other server computers and data storage areas such as historical data server 40 and data storage area 50.

Figure 2:
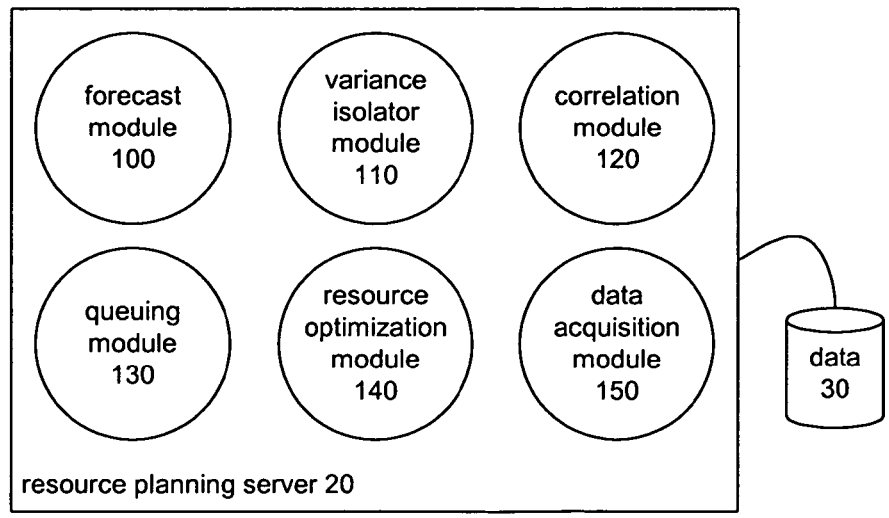
FIG. 2 is a block diagram illustrating an example resource planning server according to an embodiment of the present invention.

FIG. 2 is a block diagram illustrating an example resource planning server 20 according to an embodiment of the present invention. In the illustrated embodiment, the resource planning server 20 is configured with a data storage area 30 and comprises a forecast module 100, a variance isolator module 110, a correlation module 120, a queuing module 130, a resource optimization module 140, and a data acquisition module 150. The data acquisition module 150 serves to obtain data from remote data storage areas and convert such data to a format that is useable by the appropriate module of the server 20.

The forecast module 100 is configured to analyze historical transaction data and create a forecast of transaction volume for a particular location (or multiple locations, as necessary). The historical transaction data is preferably stored in the data storage area 30, but may also be accessed by the forecast module via a network, for example, in combination with the data acquisition module 150.

The variance isolator module 110 is configured to analyze demographic and economic data and identify certain variance factors that may be applied to a forecasted transaction volume to produce an enhanced forecast. In one embodiment, the forecast module 100 may preferably employ a forecast enhancement method that takes into account the identified variance factors in order to produce an enhanced forecast of transaction volumes for a particular location (or multiple locations, as necessary). Advantageously, the variance factors identified by the variance isolator may apply to a particular location or may be generally applicable to multiple locations or a geographic region (or some other criterion) that describes a subset of locations.

The correlation module 120 is configured to analyze time study observations and location specific attributes, for example, attributes related to service activities. In this description, transactions and service activities are used separately to describe separate concepts. A transaction is a discrete event or set of events that can be well defined, for example opening a new deposit account at a financial institution. A service activity is a completion oriented concept that may involve one or more events that may or may not be repeated when the service activity is performed by different employees in different situations at different times to serve different customers. For example, responding to a customer complaint may be described as a service activity.

The correlation module 120 preferably analyzes time study observations and location specific attributes that can be stored in a data storage area or input by an operator and as a result of the analysis identifies an average of transaction and service activity times on a per transaction and per service basis per location.

The queuing model 130 is configured to analyze predefined target service levels, the correlated transaction and service activity times, and the enhanced transaction volume per location to create full time equivalent requirements. In one embodiment, the FTE requirements identifies the FTE requirements for each position at a particular location.

The resource optimization module 140 is configured to analyze the FTE requirements in connection with data regarding service activities and human resource management objectives and requirements. The analysis conducted by the resource optimization module 140 preferably results in an optimized work schedule for a particular location that includes the use of part time equivalent resources to more effectively and economically meet the forecasted need. Additionally, the analysis of the resource optimization module 140 preferably results in a long term work force requirements that assist in the long term planning of full time and part time equivalent resources and their corresponding skill sets.

Figure 3:
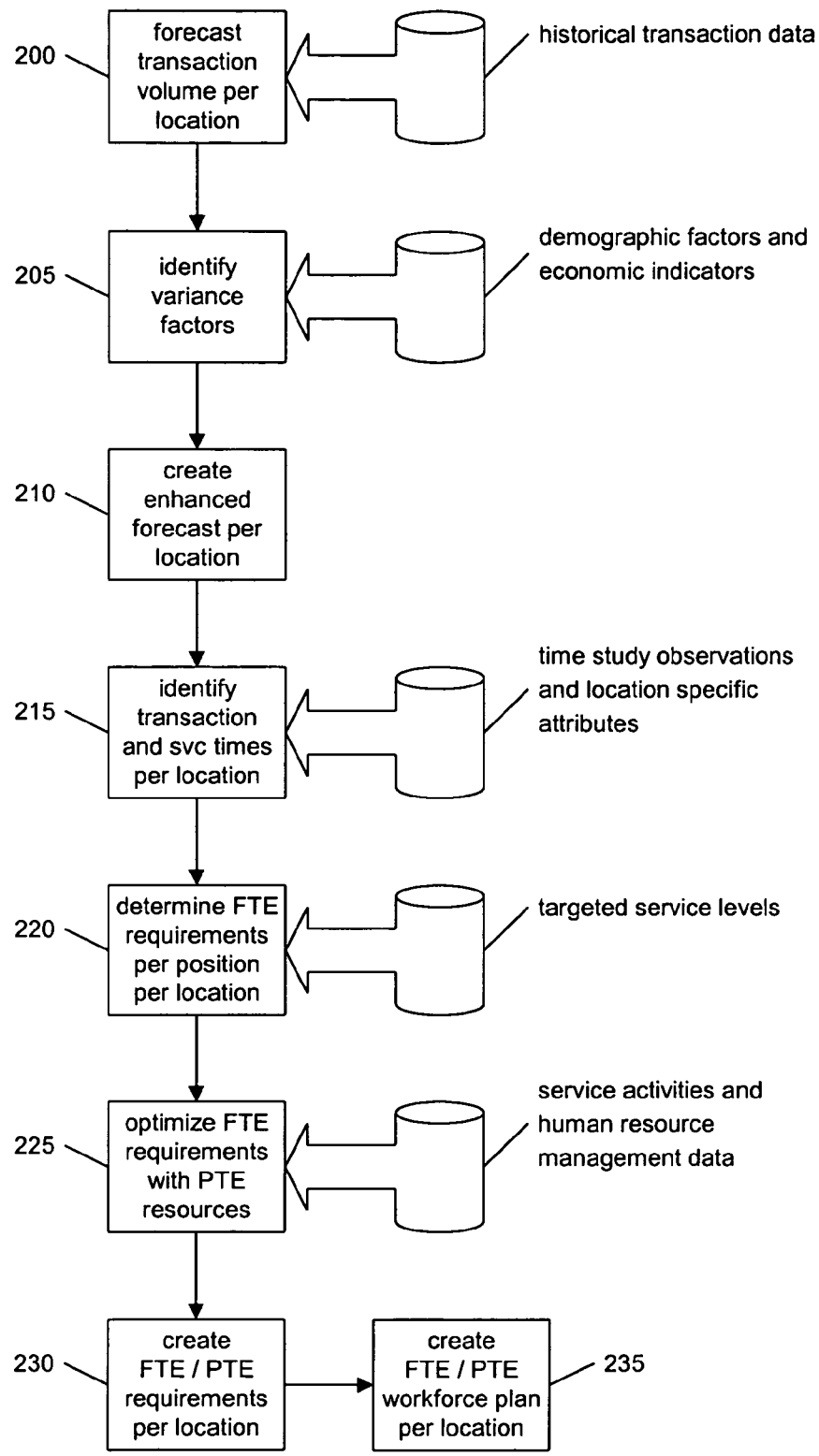
FIG. 3 is a flow diagram illustrating an example high level process for workforce requirements management according to an embodiment of the present invention.

FIG. 3 is a flow diagram illustrating an example high level process for workforce requirements management according to an embodiment of the present invention. Initially, in step 200, the transaction volume per location is forecasted. The transaction volume may also be forecasted in a more granular fashion such that the volume per transaction type per time interval per location is forecasted. In order to create this forecast, historical transaction data is preferably analyzed. In one embodiment, a forecasting module can be tasked with creating transaction volume forecast.

Next, in step 205, certain variance factors are identified. The identification of these factors can be the result of analyzing demographic and economic data associated with historical transaction information. In one embodiment, a variance isolator module can be tasked with identifying the variance factors. As will be understood by one having skill in the art, steps 200 and 205 are not necessarily sequential. These steps and the other steps described herein with respect to the flow diagrams may be carried out in parallel or in random order. The only restriction of the operational order of the described steps is the input. Accordingly, where one step requires the input from another step, then a sequential order of those steps is implied.

Once the forecast transaction volume and variance factors are identified, in step 210 an enhanced forecast (per location or per transaction per location) can be created. The enhanced forecast preferably optimizes the initial forecast based on the particular variance factors identified and any correlating data related to current demographic and economic conditions.

In step 215, actual or average transaction times and service activity times are collected and identified. In one embodiment, transaction and service times may be collected by manual observations at selected locations. Then the correlations between these transaction and service times and the location specific characteristics are investigated by means of a multivariate regression analysis. The resulting regression equation is evaluated to determine the location specific regression formulas for each transaction or service type.

Once the transaction times, service activity times, and the enhanced forecast are available, they are analyzed in step 220 in combination with predetermined targeted service levels to determine the necessary workforce required to meet the targeted service level. For example, the number of full time equivalents per time interval per location are identified that are required to meet the targeted service level. In one embodiment, a queuing module may be employed to create the FTE requirements.

After the FTE requirements are identified, in step 225 the requirements are analyzed along with service activity information, human resource management data, and a proposed work week schedule. Accordingly, the FTE requirements are optimized with part time resources according to availability and skill sets. In one embodiment, a resource optimization module may be used to carry out this function. Preferably, the optimization step results in a workforce schedule for a location (or multiple locations), as illustrated in step 230, and also a long term workforce plan for full time an part time equivalents per location, as shown in step 235.

In an exemplary embodiment, the workforce requirements management system uses historical transaction data and a decomposition based forecasting algorithm to estimate the future time-series transaction volumes. Additionally, historical transaction data, demographic data, and economic indicators are used to identify the sources of variance in transaction volumes due to assorted factors (trend, seasonality, monthly patterns, etc.) in the time-series data. Moreover, the transaction and service activity times are determined by using observation data in conjunction with historical transaction data.

When determining the FTE requirements, the system uses the enhanced forecast of transaction volumes and the established transaction and servicing activity times. Also, when the FTE requirements are optimized, the system utilizes a linear programming model which uses the forecasted FTE requirements, human resource constraints, cost considerations to determine the optimum number of resources required, the optimum full-time and part-time mix of those resources, and a suggested work week schedule.

Figure 4:
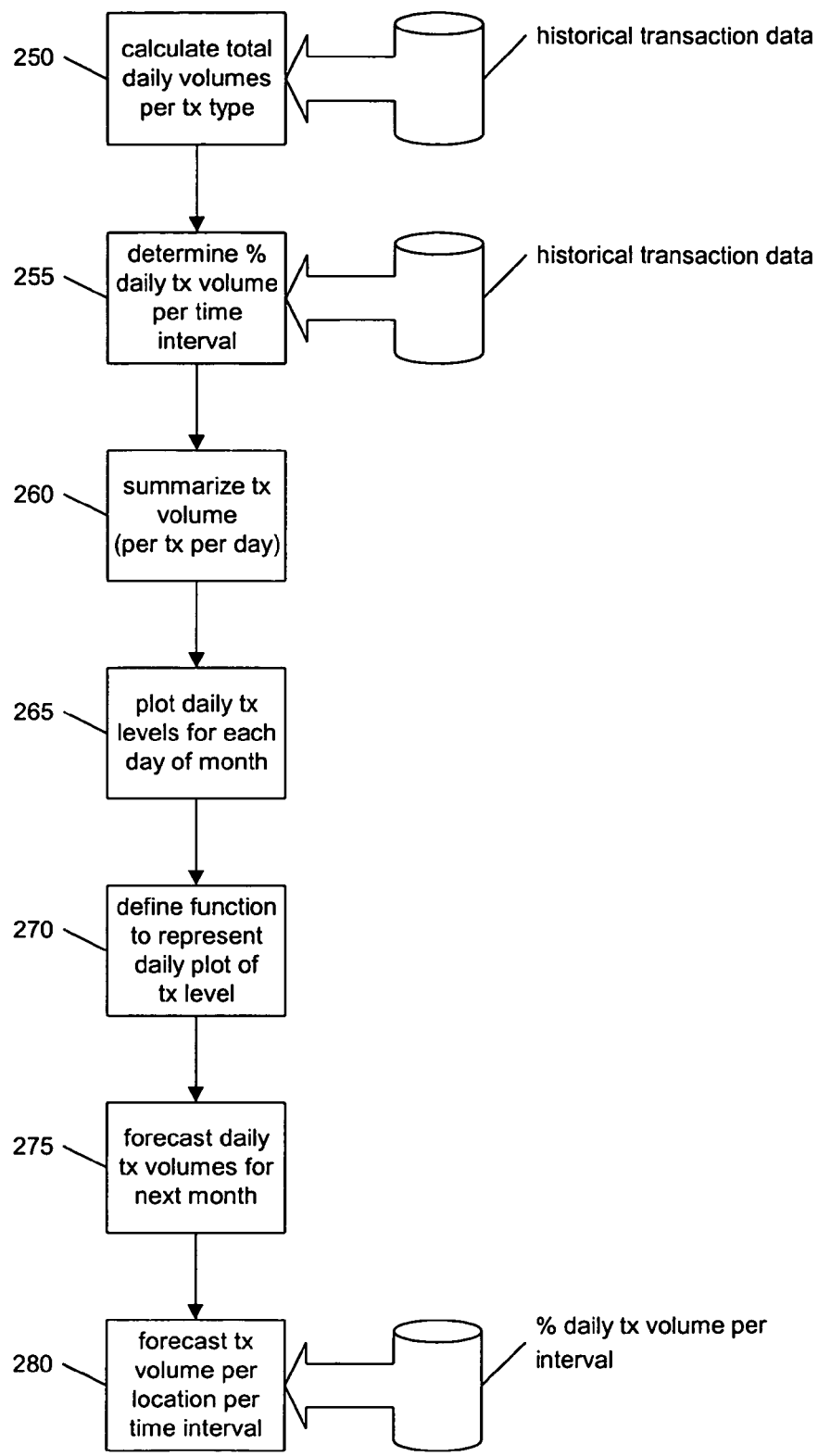
FIG. 4 is a flow diagram illustrating an example process for forecasting transaction volume levels according to an embodiment of the present invention.

FIG. 4 is a flow diagram illustrating an example process for forecasting transaction volume levels according to an embodiment of the present invention. The process begins at step 250, where the workforce requirements management system calculates the total daily transaction volume per transaction type. To calculate the total daily transaction volume, historical transaction data per each time interval (hour, half-hour, etc.) is consulted and analyzed.

Next, in step 255 the percentage of the daily transaction volume for particular time intervals is calculated. A variety of time intervals may be used, for example, per 8 hours, per 4 hours, per hour, and per half hour. Depending on the desired granularity, other time intervals may also be employed. In step 260, the total transaction volume (per transaction per day) is summarized so that it may be plotted for each day of the month, as illustrated in step 265. Summarizing the transaction volume is important because in certain cases many years of historical transaction data may be analyzed and therefore the resulting mass of raw data would be cumbersome to work with and in most circumstances impractical given the physical limitations of memory space and processor power on a typical resource planning server.

Once the daily transaction levels for the month have been plotted, in step 270 the system defines an appropriate function that represents the particular daily plot for the transaction level. Multiple functions may be defined, as necessary, to represent specific transaction levels for different transaction types. After a function (or set of functions) has been defined, the daily transaction volumes for the next month may be calculated, as shown in step 275. These calculations may be broken down by transaction type.

In step 280, the forecasted daily transaction volume is divided into time intervals according to the previously determined percentage of daily transaction volume per time interval. This breakdown may also preferably apply to the various different transaction types, and the calculations may advantageously be performed for more than one location. Thus, the result of the process for forecasting transaction volume levels is preferably a daily forecast of transaction volume, per time interval, per transaction type, per location.

An example deployment of the above described process for forecasting transaction volume levels begins initially with a data import of historical transaction data. In this step, transactions (for each transaction type, for each location, and for each time interval) from an ERP system or main transaction data storage area are imported to a temporary database for the historical data period. The granularity associated with the data import is defined by the desired time interval (e.g., hourly, half-hourly, 15 min, etc.).

Next, for each (1) day of the week; (2) transaction type; and (3) location, the percentage of total daily transaction volume is calculated for each time interval. These percentages define intra-day fluctuations (between time intervals). Next, the total daily transaction volumes are calculated for each transaction type and for each location. Since the percent total daily transaction volume for each time interval is stored, this aggregation does not cause the loss of intra-day fluctuation patterns.

Next, for each (1) day of the week; (2) transaction type; and (3) location, the total daily transaction levels are plotted for each day of the month. A function can then be defined to fit the data in the plot. This function can then be employed to determine the total transaction volume forecast for the particular day. Finally, the percentage of total daily transaction volume per time interval is used to break down the total daily forecast into hourly or half-hourly volumes as determined by the desired time interval.

Figure 5:
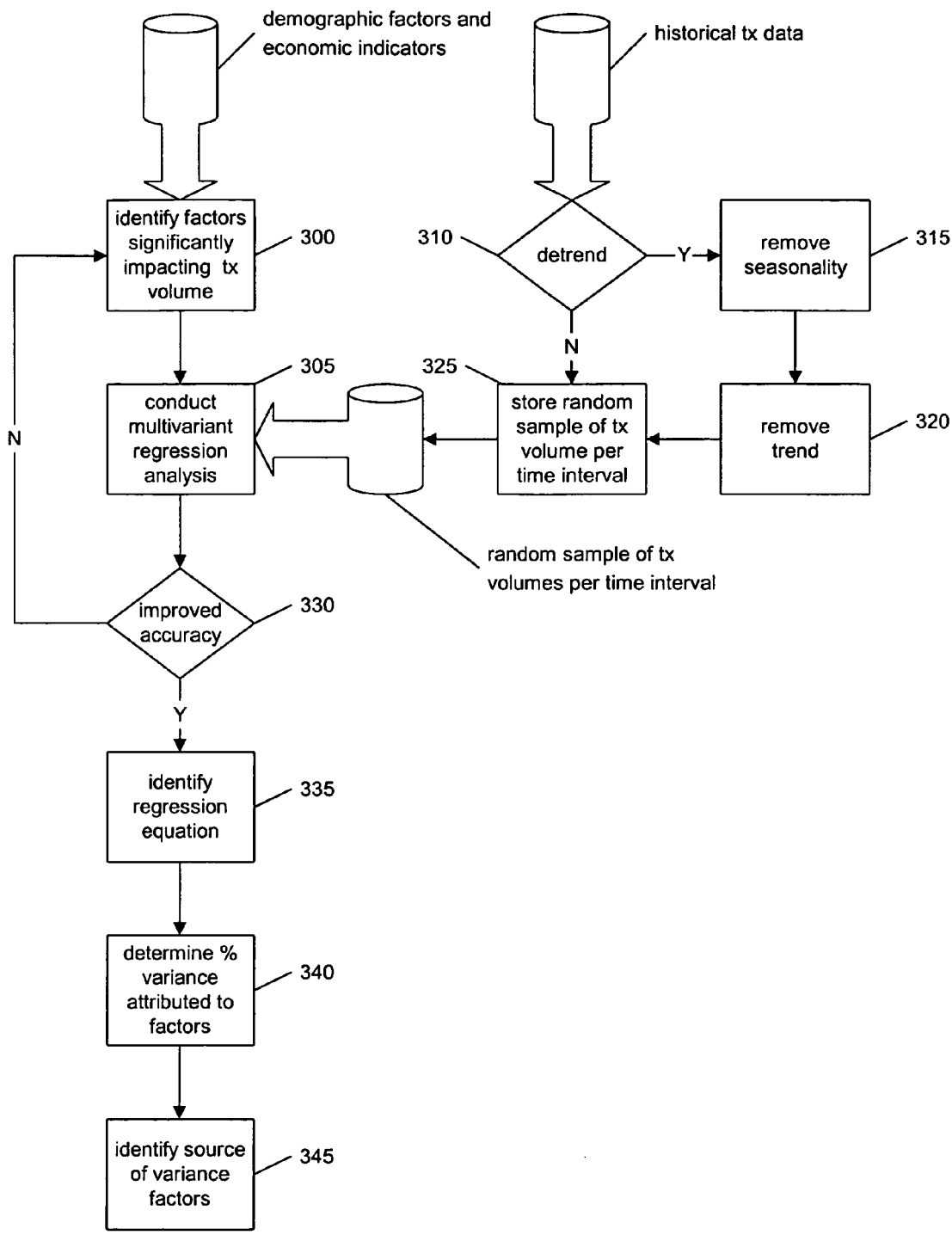
FIG. 5 is a flow diagram illustrating an example process for isolating variance factors to improve the accuracy of forecasting according to an embodiment of the present invention.

FIG. 5 is a flow diagram illustrating an example process for isolating variance factors to improve the accuracy of forecasting according to an embodiment of the present invention. Initially, in step 300, the workforce requirements management system identifies those factors that significantly (or moderately, depending on the threshold sensitivity level) impact transaction volume. This determination is made based upon an analysis of demographic factors, economic indicators, and historical transaction data (or perhaps a summary or random sample of historical transaction volumes).

For example, in step 310, a random set of historical transaction data is analyzed to determine if it is affected by certain trends or seasonal fluctuations in the data. If so, then the historical transaction data can be normalized by removing seasonal fluctuations and removing other trends, as shown in steps 315 and 320. Once the historical transaction data has been normalized (if necessary) the forecasts produced in the forecasting modules are revised by the appropriate normalizing technique, such as time series regression, Box-Jenkins method, etc.

Next, in step 305 a regression analysis is performed on the stored sample of historical transaction volumes, taking into consideration also the identified factors that impact transaction volume. In step 330, the results of the regression analysis are examined to determine if the identified factors have a statistically significant impact on the changes in the transaction volume. If a significant impact is not found, the process circles back to identify other factors that affect the transaction volume and those factors are then analyzed using the regression analysis.

Once the potential variant factors are identified and the statistically significant factors are selected, the appropriate regression equation is identified in step 335 and the percentage of variance attributable to each specific factor is determined, as shown in step 340. Accordingly, in step 345, the source of the variance factors are also identified.

An example deployment of the above described process for isolating variance factors to improve the accuracy of forecasting transaction volume levels begins initially with a classification of the factors that cause fluctuation in the transaction or service demand level into two groups. The first group defines time related factors such as trend, seasonality, monthly effects, weekly effects, daily effects, hourly effects and holiday (before, during or after) effects. The second group defines demographic factors such as average income, education level, etc. and economic indicators such as GDP growth, interest rate, unemployment rate, etc.

Next, the factors that cause transaction levels to fluctuate are determined and the transaction volume level is represented as a function of these factors. For example, a multiple linear regression approach can be employed to represent the transaction volume level as a function of the identified factors, as will be understood by one having skill in the art and explained further below.

In the multiple-regression model, the total transaction level is the dependent variable and the various independent variables are defined to represent each of the above identified factors. The regression analysis produces a functional form (of all the factors that impact transaction volumes) that represents the total transaction volume with the least amount of possible error.

Moreover, in the regression analysis, a sample from the transaction volume level data per time interval (ie. hourly, half-hourly, etc) is used. As can be understood, the full data set, comprising transaction volumes per time interval spanning multiple years, would require an extremely large database, the use of which is untenable for real time calculations.

Next, the percentage of decomposition for the transaction volume level variance in terms of covariance of transaction volume level and the identified factors is calculated. Advantageously, each of the factors identified in the first step are represented in the calculation. The result of the calculation is the percentage of transaction volume variation that is explained by each of the previously identified factors. Accordingly, an adjustment can advantageously be made in the forecasting process to compensate for the variation introduced by the particular factor. The corresponding adjustment for the factor is then incorporated in the forecasting algorithm to enhance the quality (i.e., accuracy) of the forecast.

Figure 6:
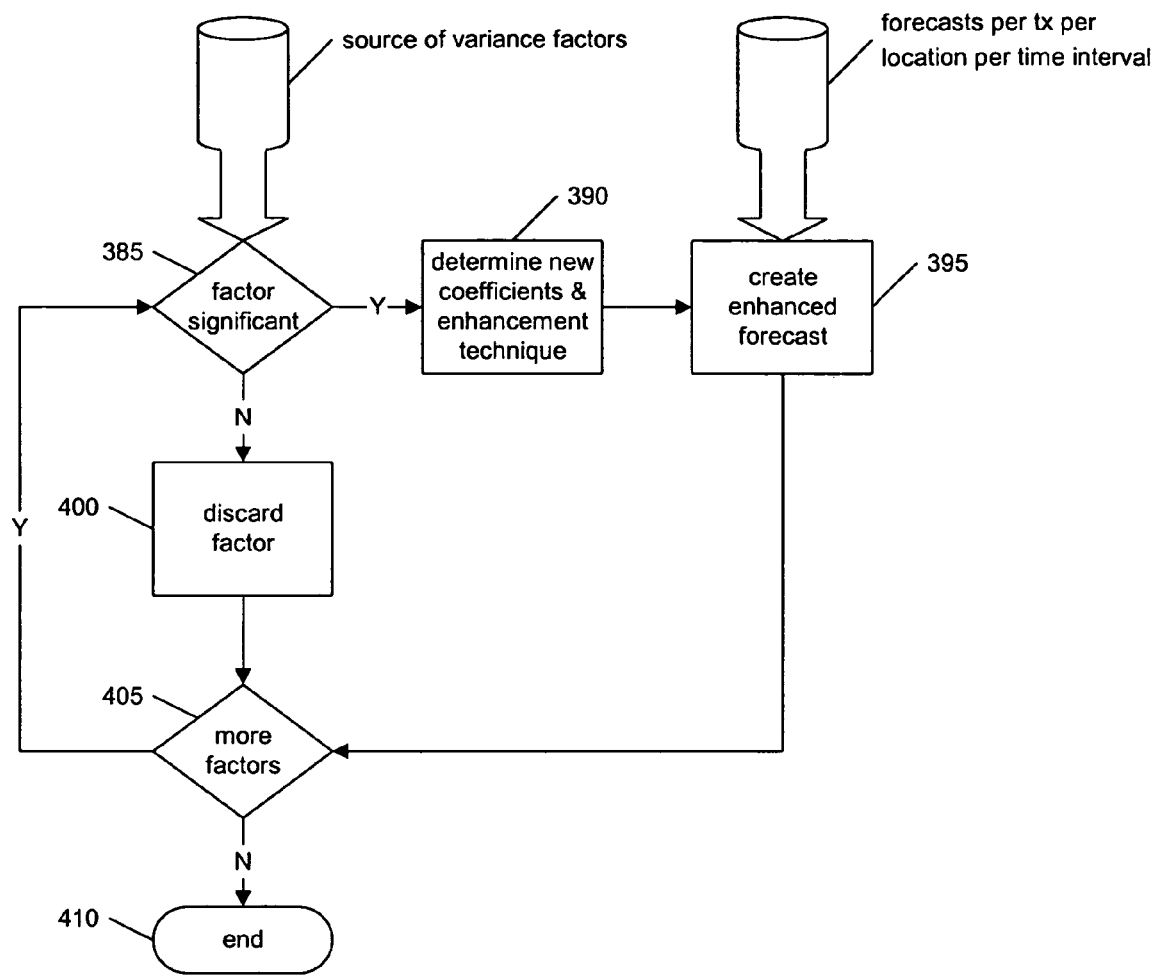
FIG. 6 is a flow diagram illustrating an example process for enhancing forecasts according to an embodiment of the present invention.

FIG. 6 is a flow diagram illustrating an example process for enhancing forecasts according to an embodiment of the present invention. In the illustrated embodiment, the process begins in step 385 when the workforce requirements management system determines if a particular factor is significant. If the factor is determined not to be significant, then the factor is discarded in step 400 and the system checks to see if there are more factors, as determined in step 405. If there are no more factors, the process ends at step 410. If there are additional factors, the process returns to step 385 where the next factor is examined to determine if it is significant.

If a factor is significant, then in step 390 new coefficients and an enhancement technique for the forecasting equations are determined. Using the new equations with the appropriate new coefficients, the forecast of transaction volume per time interval (and per location) are consulted to create an enhanced forecast of the transaction volume for the particular transaction type, time interval, and location, as illustrated in step 395. Once the enhanced forecast is created, the system checks to see if there are more factors. If there are, the process continues. If there are not, then the process ends.

An example deployment of the above described process for enhancing transaction volume level forecasts begins initially with obtaining a factor (identified by isolation of variance) and the contribution of the factor in the variability of the transaction volume. If the contribution of the particular factor is significant, e.g., it is higher than a certain threshold level; a specific action is taken in the forecasting algorithm.

For example if trend is an important factor, then the forecasted values are corrected with the trend coefficient. As will be understood by one having skill in the art, there are conventional methods to calculate a particular trend coefficient such as double exponential smoothing, time series regression, Box-Jenkins, etc. Accordingly, the trend factor in the historical data is calculated first and then the forecasted values are adjusted with the identified significant factor.

The adjustment technique may depend on the trend factor calculation method. For example, the trend factor is first extracted and then the forecasting algorithm is executed and finally the forecasted values are corrected with the trend factor. If the seasonality is an important factor, the seasonality coefficients are calculated and the forecasted numbers are adjusted with these coefficients (for example, if the length of the season is 6 months, the seasonality factor coefficients can be the percentage of total seasonal transaction level that happen in the first month, second month, etc.). In more interesting examples, if the demographic factors or economic indicators are determined to be an important factor, their impact can be assessed by using a regression analysis. These assessments are incorporated to the forecasts to adjust the estimates generated by the initial algorithm.

Figure 7:
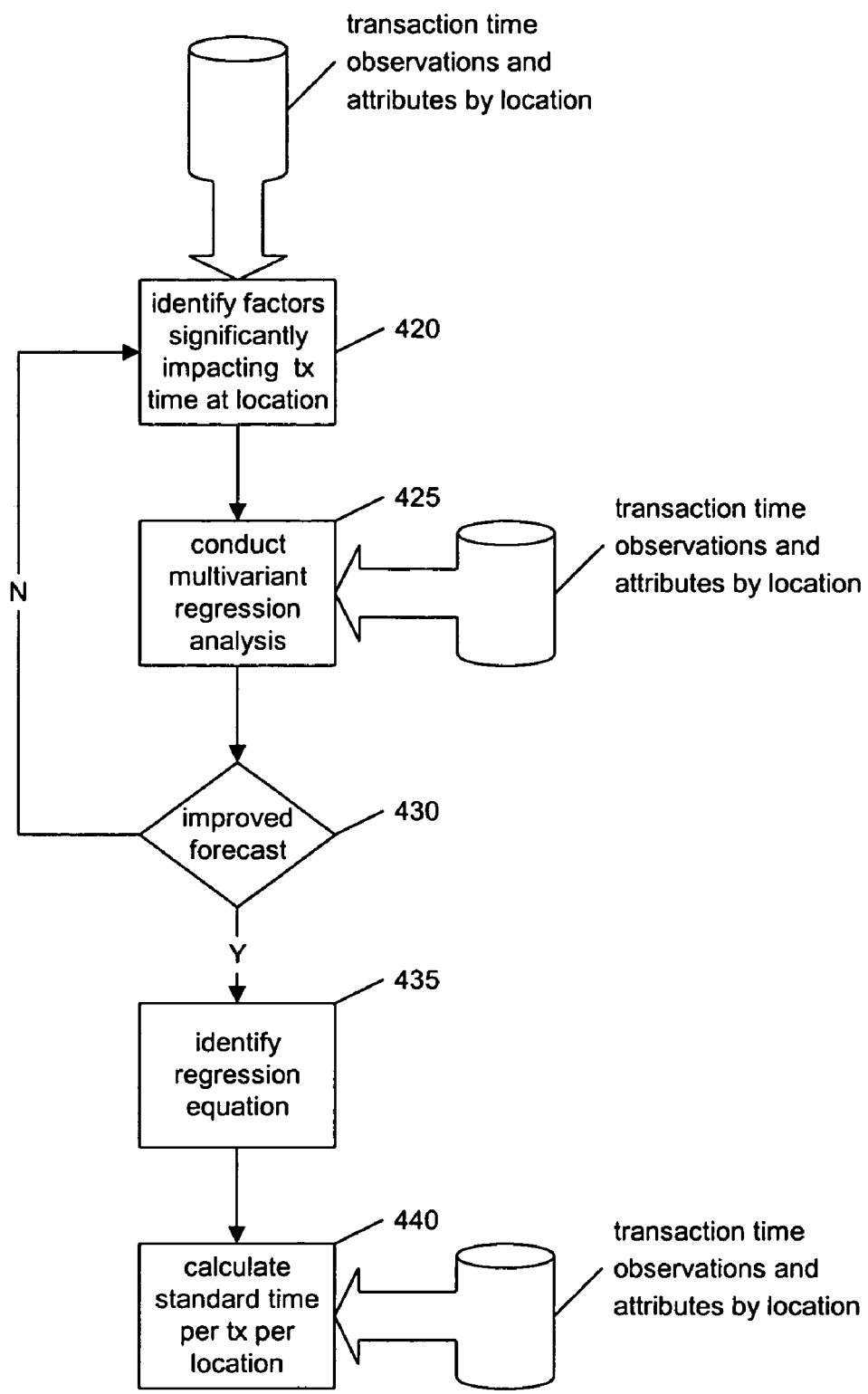
FIG. 7 is a flow diagram illustrating an example process for determining transaction and service activity times according to an embodiment of the present invention.

FIG. 7 is a flow diagram illustrating an example process for determining transaction and service activity times according to an embodiment of the present invention. Initially, in step 420, those factors are identified that significantly impact the transaction time at the location. Alternatively, factors that moderately impact transaction time may also be identified, depending on the desired sensitivity. To identify the factors, the system analyzes transaction time observational data and attributes that may be manually collected or automatically generated. Next, in step 425, a multivariant regression analysis is performed on the identified factors, taking also into consideration the raw transaction time observations and attributes.

If the regression analysis shows statistically sound results, as determined in step 430, then a regression equation is identified in step 435. If the regression analysis shows the current factors do not explain the variation in the service times, then the process returns to the previously described identification step 420 and more factors are investigated. Once a regression equation has been identified that improves the forecast, in step 440 a standard time per transaction per location is calculated, taking also into consideration the raw transaction time observations and attributes.

An example deployment of the above described process for determining transaction and service activity times begins initially with an assessment of the transaction and service activity times for each transaction and activity type and an assessment of the total amount of time per day required for these activities. Preferably, a time study methodology is employed to collect transaction times and a work sampling methodology is employed to collect activity times. These methodologies can be manually implemented or automated.

Importantly, in service-oriented organizations, the nature of transactions and service activities can vary greatly in duration. Thus, the exact duration of each transaction or service activity is not predictable. For example, in the banking industry the same transaction type within a branch network may vary greatly in duration due to branch specific factors such as customer demographics or physical branch equipment, (e.g., a deposit with cash back may take longer in a branch that has a large number of customers that speak English as a second language as compared to a branch that has predominantly an English speaking customer base.

Accordingly, a correlation of the variability in transaction and service activity times depending upon the various environmental and demographical factors can be employed to improve the quality of the transaction time estimation.

Thus, the correlation model initially determines a sample set of locations where the time studies and work sampling are conducted. (This description assumes a service organization with multiple locations). This step requires careful analysis. In order to reduce the bias in the sample, the locations are preferably randomly selected. In addition, the sample set preferably includes locations that reflect all the different characteristics of the organization in terms of size, location, demographic characteristics, type of the major transactions, etc. Therefore, the list of available locations can preferably be divided into strata and then a sample set is randomly picked in each stratum.

Once the sample locations are determined, the analysts conduct on site observations. During observation, an analyst randomly selects a resource and observes the transaction type or service activity being executed and the duration of time. The analysts also record if there is any special factor that effected the time. For example, if the customer required additional assistance pursuant to a particular demographic factor, e.g., senior citizen or young student.

The number of observations required for each transaction or service activity type is determined based upon the variability of the collected times. Statistical confidence intervals are created to make these analyses. Once enough data from observations is collected, the average and standard deviations of each transaction and service activity type are calculated for each location. Understandably, the average duration of time for each transaction or servicing activity of the same type will vary for each location because of location specific factors (i.e., type of technology used in the location, size, customer demographics, etc.) or the way the transaction or servicing activity is delivered (i.e., drive-through window or walk-in service, or the use of cash dispensing machines in banking).

Next, all of the characteristics for the particular location are identified and another statistical analysis is conducted to determine the statistically significant factors affecting the transaction and service activity times. A correlation analysis is next executed to determine if certain auto-correlations exist among the statistically significant factors. If there is strong auto-correlation, then one of the highly correlated factors is selected for a regression analysis that is conducted to define the transaction times in terms of various location characteristics. The resulting regression formulation helps to accurately estimate the transaction time for the rest of the organization (i.e., at the locations that were not present in the sample set).

Figure 8:
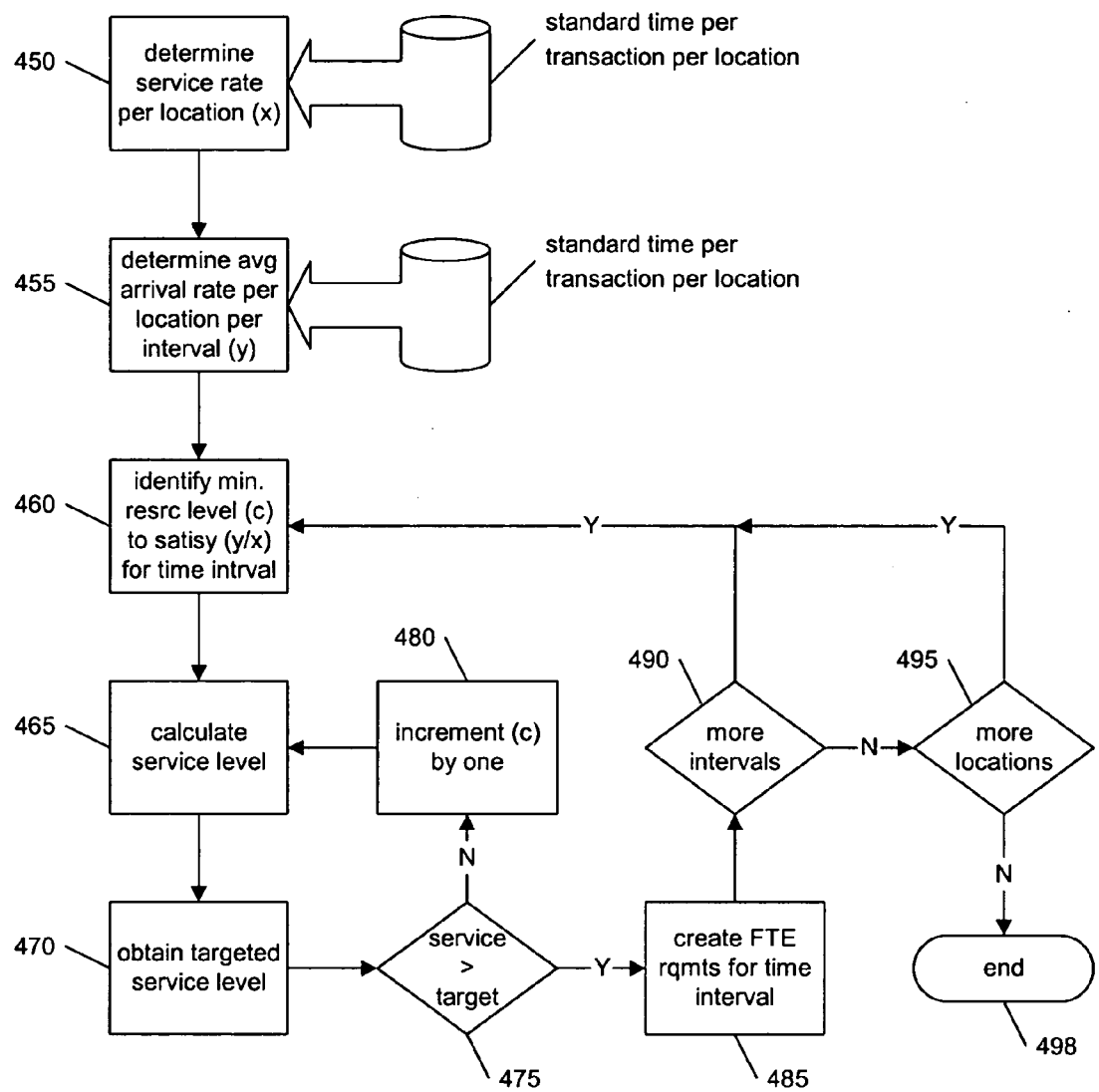
FIG. 8 is a flow diagram illustrating an example process for determining the necessary full time equivalent requirements to meet a predetermined service level according to an embodiment of the present invention.

FIG. 8 is a flow diagram illustrating an example process for determining the necessary full time equivalent requirements to meet a predetermined service level according to an embodiment of the present invention. In the illustrated embodiment, the process begins in step 450 where the service rate per location is determined. This service rate is identified with the variable x. The service rate is calculated by analyzing collected data representing the standard time per transaction per location.

Next, in step 455 the average customer arrival rate per location per time interval is determined, which is calculated by the intensity of forecasted transaction per time interval per location. This average arrival rate is identified with the variable y. The minimum resource level (identified with the variable c) is then identified, as shown in step 460, so that c satisfies the equation y/x. Next, in step 465 the service level is calculated and in step 470 the target service level is obtained, for example as a predetermined value in a file or table.

If the service level is greater than the target service level, as determined in step 475, then the system creates number of resources accordingly, as shown in step 485. If the service level does not meet the predetermined target service level, then the number of resources is increased by one and the service level is re-calculated. The targeted service level may also be re-obtained, although it may stay the same so that step may be skipped in the second and further iterations. In one embodiment, however, the targeted service level may change with the minimum resource level.

Once the calculated service level meets or exceeds the target service level, the full time equivalent requirements for the time interval are calculated in step 485 as previously described. If there are more time intervals to examine, as determined in step 490, the process returns to the identification of the initial minimum resource level step 460. If there are no more time intervals to examine, then in step 490 it is determined if there are more locations to examine. If there are, then the process returns to the identification of the initial minimum resource level step 460. If there are no more locations, the process completes, as illustrated in step 498.

An example deployment of the above described process for determining the necessary full time equivalent requirements to meet a predetermined service level begins initially with identifying the average transaction time (also referred as service times) for each transaction type and the forecasted number of transactions for each transaction type and for each unit time interval (e.g., hourly or half-hourly). The presently described type of process will be understood by one having skill in the art as a queuing model.

Queuing models with certain assumptions are significantly easier to describe and therefore such a model will be discussed. Alternative models, not employing assumptions, may also be employed and are contemplated by the present invention. One of these assumptions is that the Markovian property applies to the transaction intensity and activity times. In other words, it is assumed that all the transaction times are exponentially distributed. Another assumption is that the Poisson property applies to the transaction intensity per time interval (also referred as arrival pattern) for all the transaction types. Furthermore, for many different transactions with a Poisson arrival pattern, the arrival pattern of the total transactions is again Poisson with the mean equal to sum of the means of the individual transactions. It is also assumed that a different customer performs each transaction.

The transaction time for the different transactions is also assumed to be an independent exponential distribution with different means. But the overall transaction time distribution is the mixture of these exponential distributions, which is defined as hyper-exponential distribution. The mean of the transaction times is equal to the weighted average of the means of individual service times with the weights calculated according to arrival rate of transactions. Thus, assuming the transaction intensities are Poisson and the transaction times are exponential and there are multiple servers, the queuing model for this system is M/M/c.

Furthermore, because the service level criterion depends on customer waiting time, the waiting time needs to be quantified. The waiting time distribution for an individual arrival is calculated by conditioning the waiting time upon the number of customers in the system at the time the arrival occurs. The waiting time distribution is determined by using the Poisson Arrivals See Time Averages ("PASTA") approach. The queuing model therefore tries to calculate the number of required servers c in order to have the targeted percentage of customers wait less than the specified amount of time calculated.

An example queuing model will now be described to illustrate its use in the calculation of the number of required servers c. Alternative queuing models may also be employed, as will be understood by one having skill in the art. In the exemplary model, $\lambda_i$ is the arrival rate of customers for transaction i; $\mu_i$ is the service rate of transaction i for a server; and c is the number of servers. Assuming that there are n different types of transactions, then $\lambda$ and $\mu$ are defined as following:

$$\lambda = \lambda_1 + \lambda_2 + \ldots + \lambda_n$$

$$\mu = \frac{\lambda_1 \mu_1 + \lambda_2 \mu_2 + \ldots + \lambda_n \mu_n}{\lambda_1 + \lambda_2 + \ldots + \lambda_n}$$

In order to have steady state probabilities, $\lambda/c\mu$ should be less than 1. The steady state probability distributions of the system can be easily derived, as will be understood by one having skill in the art.

Also, in the exemplary queuing model, let $P_i$ be the probability that there will be i people in the system. These probabilities are calculated with the following expressions:

$$P_i = \left( \sum_{n=0}^{c-1} \frac{\lambda^n}{n! \mu^n} + \sum_{n=c}^{\infty} \frac{\lambda^n}{c^{n-c} n! \mu^n} \right)^{-1}$$

$$P_n = \begin{cases} \frac{\lambda^n}{n! \mu^n} P_0 & \text{for } 1 \leq n \leq c \\ \frac{\lambda^n}{c^{n-c} n! \mu^n} P_0 & \text{for } c \leq n \end{cases}$$

Let W represent the waiting time of the customer and $P(W \leq t)$ be the probability of an incoming customer will wait less than t minutes. If there are c servers and there are less than or equal to c−1 customers in the system, then a new customer arrival will not wait (i.e. W=0). The probability of this case is given as follows:

$$P(W = 0) = \sum_{n=0}^{c-1} P_n$$

If there are c servers and there are more than or equal to c customers in the system, then a new customer will have to wait. (i.e. W>0). The probability of waiting being less than the targeted level depends on the number of existing customers in the system. We can write the following expression to represent this conditional probability:

$P(W \leq t|$new arrival finds n customers in the system)
$= P(n-c+1$ completions in t)

To determine $P(W \leq t)$, the above probability for each possible n is computed and summed. The resulting aggregate probability is then mathematically equivalent to $$P(W \leq t) = P(W = 0) +$$

$$\sum_{n=c}^{\infty} P(W \leq t \mid n \text{ customers in the system}) P_n$$

-continued $$P(W \leq t) = \sum_{n=0}^{c-1} P_n + \left(1 - \sum_{n=0}^{c-1} P_n \right)(1 - e^{-(c\mu - \lambda)t})$$

Accordingly, the minimum number of servers required to satisfy the service criterion of having a certain percentage of the customers wait less that the targeted level, e.g., 85%, is determined by the following method: (a) start with the smallest c where ($\lambda/c\mu < 1$); (b) determine $P(W \leq t)$ for t (5 min.) and if it is less than the targeted probability (e.g. 85%) then (i) increase c by 1 and go to step (b), else go to step (c); (c) repeat step (b) until $P(W \leq t)$ is less than the targeted probability (e.g. 85%); and (d) the minimum number of servers is c.

The forecasting algorithm generates transaction frequency forecasts for every unit time interval (i.e., for each half-hour interval). Thus, the above described queuing model determines the required number of resources for every unit time interval. This calculated number of servers is the minimum numbers that the service organization needs in order to provide the targeted service level.

Figure 9:
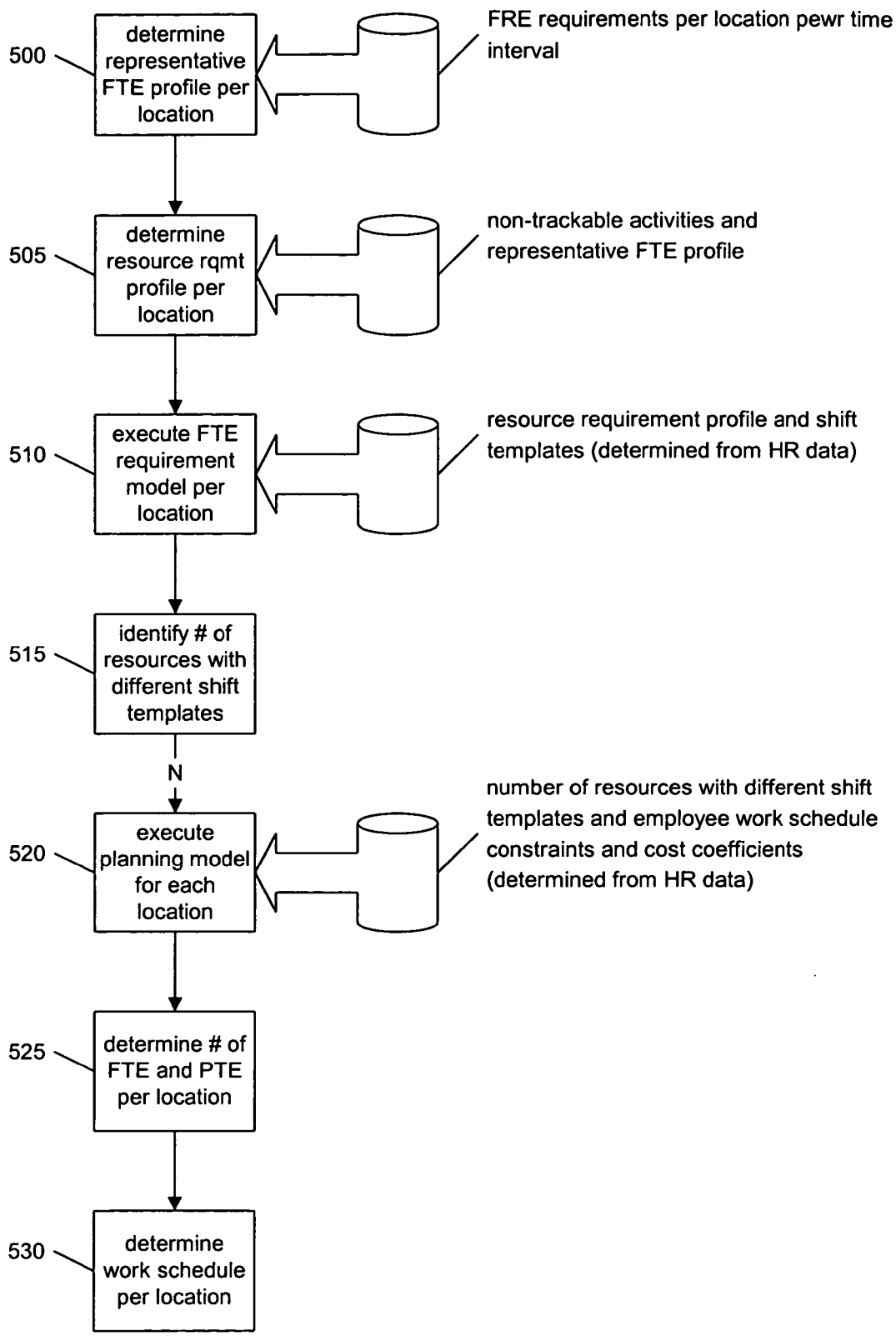
FIG. 9 is a flow diagram illustrating an example process for optimizing staff levels and work schedules according to an embodiment of the present invention.

FIG. 9 is a flow diagram illustrating an example process for optimizing staff levels and work schedules according to an embodiment of the present invention. The process begins at step 500 where a representative full time equivalent profile is determined for a particular location (or for each location if there are multiple). Data that is analyzed in this step in order to make the determination includes the FTE requirements for each time interval (and for each location, as appropriate). Next, in step 505, the system determines the resource requirement profile after examining the service activity level data and representative FTE profile information. As with the previous step, this may be performed for multiple locations, as necessary.

Once the resource requirement profile has been determined, in step 510 the system then executes the FTE requirement optimization model (per location) in order to identify the number of required resources with different shift templates, which is performed in step 515. Data that is utilized in the execution of the FTE requirement model in step 510 includes the resource requirement profile and predetermined shift templates that are determined based upon human resource data.

The system next, in step 520, executes the planning optimization model (per location) to determine in step 525 the long term number of full time equivalents and part time equivalents needed to meet the forecasted transaction and service activity levels according to the desired service level. Data that is utilized in the execution of the planning model in step 520 includes the identified number of resources with different shift templates, employee work schedule constraints (derived from human resource data), and certain cost coefficients (also derived from human resource data). Additionally, in step 530 the system determines an appropriate and optimized FTE and PTE work schedule (per location) that presents the most efficient combination of FTE and PTE employees to meet the forecast transaction and service activity levels at the desired service level with the appropriate employee skill sets and at the minimum salary level.

In general, an efficient service organization should be able to increase staff to meet the customers peak time needs as well as reduce staff when traffic is slow and minimize the costs of these staffing adjustments. This is not possible unless the organization has a complement of resources that can work shorter shifts, which vary from day to day, week to week.

However, too many part time resources (i.e., short shift and flexible schedule employees) can lead to greater turnover, increased recruiting and training costs, and a lower average skill set per employee. Therefore, service organizations have the challenge of finding the right balance.

Thus, any service organization employs certain full time resources with low schedule flexibility but high retention and high skill level and other part time resources with high flexibility but low retention and low skill level. Accordingly, a service organization needs to be able to optimize the long term balance of its full time and part time workforce while at the same time optimizing short term weekly and monthly schedules.

An example deployment of the above described process for optimizing staff levels and work schedules begins initially with calculating the number of resources required in each unit interval. This calculation is described above as taking place in the queuing model. The number of resources that are output by the queuing model correspond to FTE requirements. Accordingly, optimizing the number of FTE requirements will determine the best full time and part time resource mix and schedule those resources to fit the intra-day and intra-week fluctuations identified by the queuing model.

Thus, in the optimization process, the workforce requirements management system employs an integer linear programming ("ILP") model. In order to segment the ILP models into solvable sizes, the problem is divided into two models. In the first model, the requirement model, the optimum number and type of the resource schedule templates are determined. These schedules are optimized to ensure that there are enough employee resources to adequately (and efficiently) cover the FTE requirements of the organization for transaction volume and service activity levels. In the second model, the planning model, the number of resources of each type (e.g., full time, part time, etc.) and their weekly working schedules are determined based on human resource management rules.

In one embodiment, the workforce requirements management system also provides for storage of time sensitive attributes and correlation of those attributes with historical transaction volumes. For example, historical data is stored as a dynamic set of time series based attributes that are correlated to the historical transaction volumes that are used to generate future forecasts. These attributes can be static values that change over time or they can be functions of time.

A time series based attribute can be assigned to any application object and incorporated into the forecasting model. An example of a time series based attribute would be an economic factor such as interest rate. Because a specifically defined interest rate has only one value for a given point in time, interest rate values can be stored as a series of values over time. These values are included in the forecast model by relating them to a historical transaction volume. The current interest rate along with the correlated historical transaction volume can then be used as a factor in predicting future transaction volumes. Advantageously, the dynamic attributes associated with each application object provide the level of granularity needed for a highly accurate forecast. For instance if forecasting for home loans, time series attributes at the corporate level, branch level, and processing center level can be related to the historical demand over time for each level.

Attributes can also be a function of time that produces a value based on the date. Some examples would be day of week, day of month, week in month, before or after holiday, or even social security check distribution day. These values can then be related to the corresponding historical transaction volumes being used to generate future forecasts. Attributes can dynamically be created on any application object by the user and included as a factor in the forecast model to impact the forecasted demand.

Figure 10:
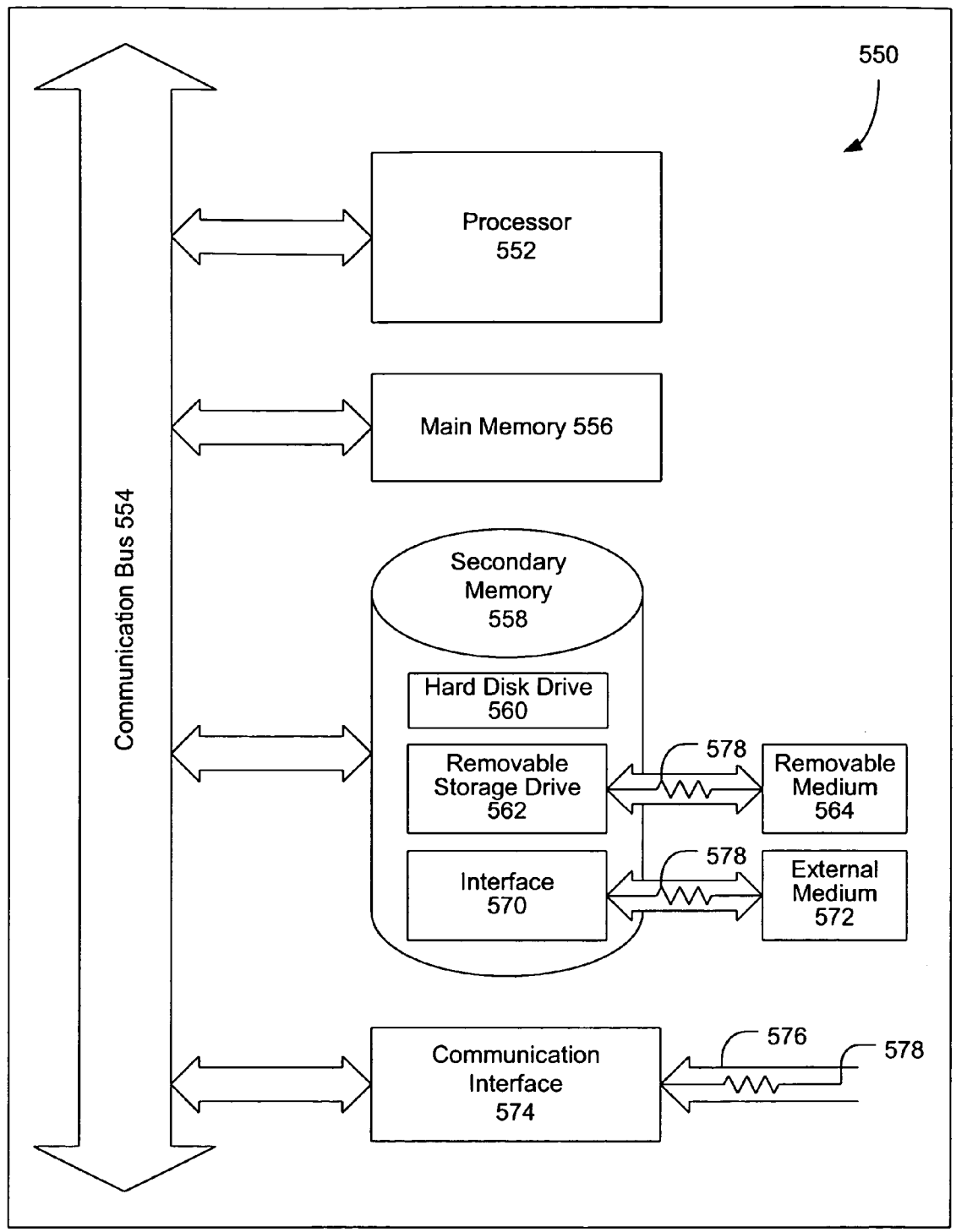
FIG. 10 is a block diagram illustrating an exemplary computer system as may be used in connection with various embodiments described herein.

FIG. 10 is a block diagram illustrating an exemplary computer system 550 that may be used in connection with the various embodiments described herein. For example, the computer system 550 may be used in conjunction with a resource planning server or other historical data server or the like. However, other computer systems and/or architectures may be used, as will be clear to those skilled in the art.

The computer system 550 preferably includes one or more processors, such as processor 552. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 552.

The processor 552 is preferably connected to a communication bus 554. The communication bus 554 may include a data channel for facilitating information transfer between storage and other peripheral components of the computer system 550. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 556 and may also include a secondary memory 558. The main memory 556 provides storage of instructions and data for programs executing on the processor 552. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a digital versatile disc ("DVD") drive, etc. The removable storage drive 562 reads from and/or writes to a removable storage medium 564 in a well-known manner. Removable storage medium 564 may be, for example, a floppy disk, magnetic tape, CD, DVD, etc.

The removable storage medium 564 is preferably a computer readable medium having stored thereon computer executable code (i.e., software) and/or data. The computer software or data stored on the removable storage medium 564 is read into the computer system 550 as electrical communication signals 578.

In alternative embodiments, secondary memory 558 may include other similar means for allowing computer programs or other data or instructions to be loaded into the computer system 550. Such means may include, for example, an external storage medium 572 and an interface 570. Examples of external storage medium 572 may include an external hard disk drive or an external optical drive, or and external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 572 and interfaces 570, which allow software and data to be transferred from the removable storage unit 572 to the computer system 550.

Computer system 550 may also include a communication interface 574. The communication interface 574 allows software and data to be transferred between computer system 550 and external devices (e.g. printers), networks, or information sources. For example, computer software or executable code may be transferred to computer system 550 from a network server via communication interface 574. Examples of communication interface 574 include a modem, a network interface card ("NIC"), a communications port, a PCMCIA slot and card, an infrared interface, and an IEEE 1394 fire-wire, just to name a few.

Communication interface 574 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 574 are generally in the form of electrical communication signals 578. These signals 578 are preferably provided to communication interface 574 via a communication channel 576. Communication channel 576 carries signals 578 and can be implemented using a variety of communication means including wire or cable, fiber optics, conventional phone line, cellular phone link, radio frequency (RF) link, or infrared link, just to name a few.

Computer executable code (i.e., computer programs or software) is stored in the main memory 556 and/or the secondary memory 558. Computer programs can also be received via communication interface 574 and stored in the main memory 556 and/or the secondary memory 558. Such computer programs, when executed, enable the computer system 550 to perform the various functions of the present invention as previously described.

In this description, the term "computer readable medium" is used to refer to any media used to provide computer executable code (e.g., software and computer programs) to the computer system 550. Examples of these media include main memory 556, secondary memory 558 (including hard disk drive 560, removable storage medium 564, and external storage medium 572), and any peripheral device communicatively coupled with communication interface 574 (including a network information server or other network device). These computer readable mediums are means for providing executable code, programming instructions, and software to the computer system 550.

In an embodiment that is implemented using software, the software may be stored on a computer readable medium and loaded into computer system 550 by way of removable storage drive 562, interface 570, or communication interface 574. In such an embodiment, the software is loaded into the computer system 550 in the form of electrical communication signals 578. The software, when executed by the processor 552, preferably causes the processor 552 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

While the particular systems and methods herein shown and described in detail are fully capable of attaining the above described objects of this invention, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A method of operating a resource planning system to transform historical transactions into workforce requirements, wherein the resource planning system comprises a processor and a memory device having program instructions stored thereon readable by the processor, wherein the program instructions, when executed by the processor, direct the processor to perform the method comprising:

analyzing historical transaction data to identify time based variance factors;

analyzing the historical transaction data to identify demographic variance factors;

normalizing the historical transaction data based on the time based variance factors, resulting in normalized historical transaction data;

identifying and selecting at least one demographic variance factor having a statistically significant impact on transaction volume from the identified demographic variance factors;

determining a measurement of variance attributable to the one demographic variance factor;

processing the normalized historical transaction data and the measurement of variance attributable to the one demographic variance factor to generate a transaction volume forecast;

analyzing the demographic variance factors to identify at least one demographic variance factor having a statistically significant impact on transaction time;

determining a transaction time based on the historical transaction data and the at least one demographic variance factor identified having the statistically significant impact on transaction time; and creating a full time equivalent requirement forecast based on the transaction volume forecast, the transaction time, and a target service level.

2. The method of claim 1, wherein analyzing the historical transaction data to identify the time based variance factors comprises comparing a fluctuation in the historical transaction data caused by each of the time based variance factors.

3. The method of claim 1, wherein analyzing the historical transaction data to identify the demographic variance factors comprises comparing a fluctuation in the historical transaction data caused by each of the demographic variance factors.

4. The method of claim 1, further comprising:
generating a transaction volume per transaction type per time interval per location forecast.

5. The method of claim 4, further comprising:
determining coefficients based on the one demographic variance factor; and
generating an enhanced transaction volume forecast based on the coefficients and the transaction volume per transaction type per time interval per location forecast.

6. The method of claim 1, further comprising:
analyzing the time based variance factors to identify at least one time based variance factor having a statistically significant impact on transaction time; and
determining a transaction time based on the historical transaction data and the at least one time based variance factor identified.

7. The method of claim 6, wherein the time based variance factor comprises a non-cyclical economic factor.

8. The method of claim 7, further comprising:
optimizing the full time equivalent requirement forecast to include part time equivalent resources; and
providing an optimized workforce schedule comprising full time equivalent resources and the part time equivalent resources.

9. The method of claim 6, wherein the determining step further comprises:
calculating the transaction time using multivariate regression analysis.

10. The method of claim 6, further comprising:
generating the transaction volume forecast based on the historical transaction data and the at least one variance factor identified.

11. A resource planning system to transform historical transactions into workforce requirements, the resource planning system comprising:
a processor configured to execute program instructions stored on a memory device, the program instructions comprising a variance isolator module, a forecast module, a correlation module, and a queuing module;
the variance isolator module, when executed by the processor, is configured to direct the processor to receive historical transaction data, analyze the historical transaction data to identify time based variance factors, analyze the historical transaction data to identify demographic variance factors, normalize the historical transaction data based on the time based variance factors, resulting in normalized historical transaction data, identify and select at least one demographic variance factor having a statistically significant impact on transaction volume from the identified demographic variance factors, and determine a measurement of variance attributable to the one demographic variance factor;
the forecast module, when executed by the processor, is configured to direct the processor to process the normalized historical transaction data and the measurement of variance attributable to the one demographic variance factor to generate a transaction volume forecast;
the correlation module, when executed by the processor, is configured to direct the processor to analyze the demographic variance factors to identify at least one demographic variance factor having a statistically significant impact on transaction time, and determine a transaction time based on the historical transaction data and the at least one demographic variance factor identified having the statistically significant impact on transaction time; and
the queuing module, when executed by the processor, is configured to direct the processor to analyze a target service level, the transaction time, and the transaction volume forecast to create a full time equivalent requirement forecast.

12. The system of claim 11, wherein the variance isolator module, to analyze the historical transaction data to identify the time based variance factors, compares a fluctuation in the historical transaction data caused by each of the time based variance factors.

13. The system of claim 11, wherein the variance isolator module, to analyze the historical transaction data to identify the demographic variance factors, compares a fluctuation in the historical transaction data caused by each of the demographic variance factors.

14. The system of claim 11, wherein the forecast module is further configured to generate a transaction volume per transaction type per time interval per location forecast.

15. The system of claim 14, wherein the variance isolator module is further configured to determine coefficients based on the one demographic variance factor; and wherein the forecast module is further configured to generate an enhanced transaction volume forecast based on the coefficients and the transaction volume per transaction type per time interval per location forecast.

16. The system of claim 11, further comprising:
the correlation module configured to analyze the time based variance factors to identify at least one time based variance factor having a statistically significant impact on transaction time, and determine a transaction time based on the historical transaction data and the at least one time based variance factor identified.

17. The system of claim 16, wherein the time based variance factor comprises a non-cyclical economic factor.

18. The system of claim 17, further comprising:
a resource optimization module configured to optimize the full time equivalent requirement forecast to include part time equivalent resources, and provide an optimized workforce schedule comprising full time equivalent resources and the part time equivalent resources.

19. The system of claim 16, wherein the correlation module is further configured to calculate the transaction time using multivariate regression analysis.

20. The system of claim 16, wherein the forecast module is further configured to generate the transaction volume forecast based on the historical transaction data and the at least one variance factor identified.

* * * * *

UNITED STATES PATENT AND TRADEMARK OFFICE
CERTIFICATE OF CORRECTION

| | | |
|---|---|---|
| PATENT NO. | : 7,650,293 B2 | Page 1 of 1 |
| APPLICATION NO. | : 10/832509 | |
| DATED | : January 19, 2010 | |
| INVENTOR(S) | : Kiran et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 103 days.

Signed and Sealed this

Twenty-third Day of November, 2010

David J. Kappos
*Director of the United States Patent and Trademark Office*